United States Patent
Corbey et al.

(10) Patent No.: US 11,712,830 B2
(45) Date of Patent: Aug. 1, 2023

(54) METHOD OF MANUFACTURING A PRINTING CYLINDER

(71) Applicant: Roto Hybrid Holdings Limited, Newhall Naas (IE)

(72) Inventors: Harrie Corbey, Naas (IE); Mark Jones, Naas (IE)

(*) Notice: Subject to any disclaimer, the term of this patent is extended or adjusted under 35 U.S.C. 154(b) by 191 days.

(21) Appl. No.: 16/971,620

(22) PCT Filed: Mar. 5, 2019

(86) PCT No.: PCT/EP2019/055387
§ 371 (c)(1),
(2) Date: Aug. 20, 2020

(87) PCT Pub. No.: WO2019/170637
PCT Pub. Date: Sep. 12, 2019

(65) Prior Publication Data
US 2020/0398470 A1    Dec. 24, 2020

(30) Foreign Application Priority Data
Mar. 5, 2018  (GB) ...................... 1803520

(51) Int. Cl.
*B29C 45/77* (2006.01)
*B29C 45/00* (2006.01)
(Continued)

(52) U.S. Cl.
CPC .......... *B29C 45/77* (2013.01); *B29C 45/0025* (2013.01); *B29C 45/14598* (2013.01);
(Continued)

(58) Field of Classification Search
None
See application file for complete search history.

(56) References Cited

U.S. PATENT DOCUMENTS

| 5,711,072 A * | 1/1998 | Nakamura | ......... G03G 15/2057 29/895.32 |
| 2003/0151166 A1 * | 8/2003 | Ohshiro | ................ B29C 45/561 425/162 |

(Continued)

FOREIGN PATENT DOCUMENTS

| DE | 19519956 A1 | 12/1996 |
| EP | 0191623 A2 | 8/1986 |

(Continued)

OTHER PUBLICATIONS

PCT International Search Report issued on PCT/EP2019/055387 dated Jul. 23, 2019; 4 pages.

*Primary Examiner* — Timothy Kennedy
*Assistant Examiner* — Olukorede Esan
(74) *Attorney, Agent, or Firm* — Bobby W. Braxton; Gregory Perrone; Braxton Perrone, PLLC (57) ABSTRACT

A method of manufacturing a printing cylinder. The method comprises providing a moulding apparatus comprising a cylindrical moulding vessel defining a moulding cavity (101). The vessel comprises at least one inlet for the ingress of moulding material. The method comprises performing an injection moulding operation comprising: injecting moulding material through the at least one inlet to substantially fill the moulding cavity with moulding material; and effecting hardening of the moulding material within the vessel (102). The method comprises removing the printing cylinder (103). At least part of the injection moulding operation is performed in the presence of an active pressure being applied to the moulding cavity.

10 Claims, 5 Drawing Sheets

(51) Int. Cl.
*B29C 45/14* (2006.01)
*B29C 45/73* (2006.01)
*B29C 45/76* (2006.01)
*B41F 13/08* (2006.01)
*B41N 1/22* (2006.01)
*B29L 31/32* (2006.01)
*B29L 31/00* (2006.01)

(52) U.S. Cl.
CPC .......... *B29C 45/73* (2013.01); *B29C 45/7653* (2013.01); *B41F 13/08* (2013.01); *B41N 1/22* (2013.01); *B29C 2045/0032* (2013.01); *B29L 2031/324* (2013.01); *B29L 2031/767* (2013.01)

(56) References Cited

U.S. PATENT DOCUMENTS

2004/0113310 A1    6/2004  Keating
2011/0203468 A1*   8/2011  Harada .................... B41N 1/12
                                                              101/401.1

FOREIGN PATENT DOCUMENTS

GB        1309099 A     3/1973
WO     2003011557 A1    2/2003

* cited by examiner

METHOD OF MANUFACTURING A PRINTING CYLINDER

PRIORITY

This application is a US 371 Application from PCT/EP2019/055387 filed Mar. 5, 2019, which claims priority from GB 1803520.4 filed on Mar. 5, 2018, the entire contents of which are incorporated herein by referring to them in this statement.

TECHNICAL FIELD

The present invention relates to a method of manufacturing a printing cylinder, and in particular a method of manufacturing a printing cylinder using an injection moulding operation.

BACKGROUND

Printing bodies, for example printing cylinders, are typically formed on a steel, aluminium, carbon or glass fibre composite substrate, to which copper is added, usually by a galvanic process (e.g. by electrolytic plating), for example for rotogravure cylinders. The copper is engraved with a printing pattern, before the printing body is coated with a chromium layer, and in particular a hexavalent chromium (chromium VI) layer, to increase its hardness and wear resistance. In some cases a zinc or nickel alloy is deposited on the copper (or directly on the substrate) and engraved before the chrome layer is added.

In some existing printing cylinders, plastics (which might be alternatively or additionally described or defined as polymers) have been used to replace at least some of the metal constituent components. One such example is patent publication US 2004/0113310 A1 which discloses manufacturing a plastics printing cylinder precursor.

Figure 1:
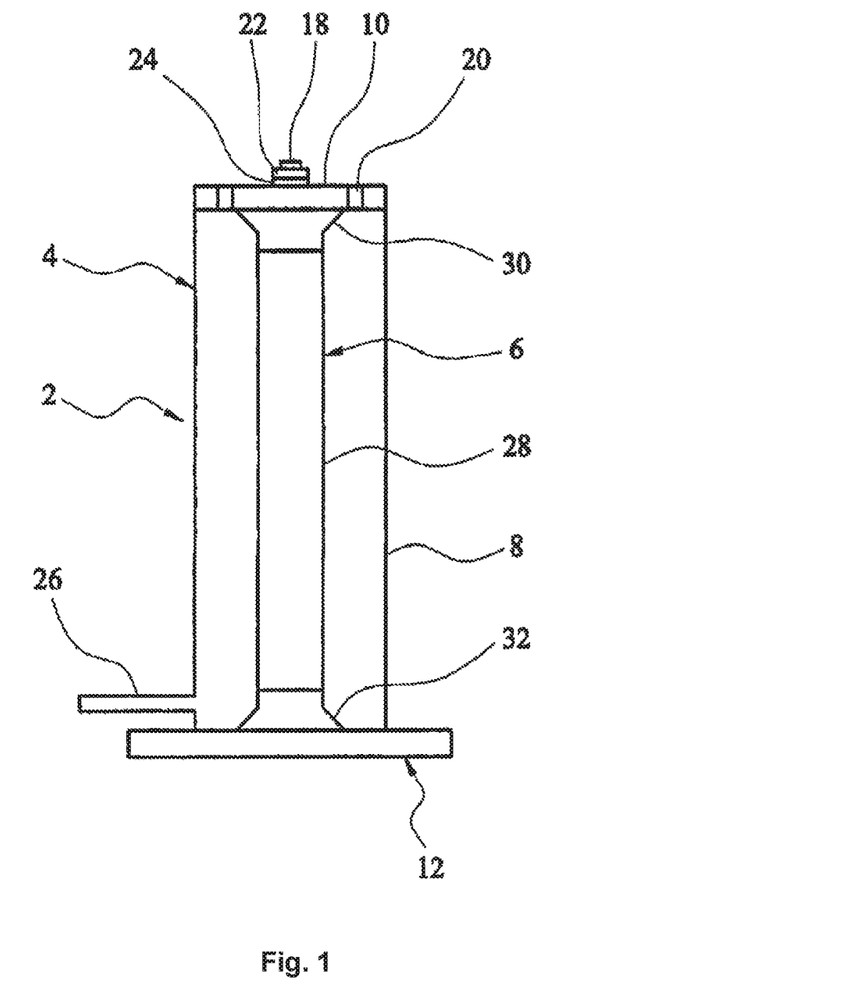
FIG. 1 shows a side cross-sectional view through an existing moulding apparatus.

The moulding apparatus used in US 2004/0113310 A1 to manufacture the plastics printing cylinder precursor is shown in FIG. 1. The moulding apparatus 2 includes a moulding vessel 4 and a removable hollow spine 6. In use, a curable moulding material, such as polyurethane foam is injected into the vessel through inlet 26. As the moulding material enters the vessel, it displaces air within the vessel 4 which is forced out of the vessel through the apertures 20. The vessel 4 is slightly overfilled in order to ensure complete filling of the vessel 4. This means that excess material passes through the apertures 20.

The manufactured printing precursor disclosed in US 2004/0113310 A1 is removed from the mould and coated with a deformable layer of metal such as copper. The copper layer may then be engraved to form a printing pattern as described above.

SUMMARY

It is an objective of the present invention to provide an improved method of manufacturing printing cylinders using moulding techniques, and in particular to provide an improved method of manufacturing printing cylinders that reduces the number of voids and other forms of imperfections in the surface of the printing cylinder.

According to the present invention there is provided a method of manufacturing a printing cylinder and a printing cylinder as set forth in the appended claims. Other features of the invention will be apparent from the dependent claims, and the description which follows.

According to a first aspect of the invention, there is provided a method of manufacturing a printing cylinder. The method comprises providing a moulding apparatus comprising a cylindrical moulding vessel defining a moulding cavity. The vessel comprises at least one inlet for the ingress of moulding material. The method comprises performing an injection moulding operation comprising: injecting moulding material through the at least one inlet to substantially fill the moulding cavity with moulding material; and effecting hardening of the moulding material within the vessel. The method comprises removing the printing cylinder. At least part of the injection moulding operation is performed in the presence of an active (high) pressure being applied to the moulding cavity.

The vessel is in other words a mould block, or any moulding structure, which defines a void (cavity) which is tubular. In other words, an object that forms a volume or space in which moulding may take place. The mould block may comprise two or more mould block components which each define half of a cylindrical shape such that when the mould blocks are positioned together, they define a tubular/cylindrical void/cavity.

The moulding material may be a plastics material, e.g. a molten polymer (otherwise known as a molten plastics) material. The active pressure may be applied the plastics material, e.g. via the active pressure being applied to the moulding cavity.

The existing manufacturing process as described in US 2004/0113310 A1 performs the injection moulding operation under a passive (that is, low) pressure, and does not apply an active, high, pressure to the moulding cavity. That is, no pressurising of the cavity takes place—the material is simply passively introduced into cavity, and no pressure builds up. The application of the active (that is, high) pressure is significant in that it may help compact the polymer chains during the hardening process to thereby reduce the effect of shrinkage and improve the finished quality of the printing cylinder. For example, the number and/or size of any voids may be reduced.

The high finished quality of the printed cylinder using the injection moulding operation of the first aspect of the invention means that the plastics printing cylinder may be engraved directly (optionally after a machining step) and/or engraved knowing that the number and/or size of voids is reduced. This latter point may mean that the cylinder may be engraved with higher resolution patterns, and/or that any engraved patterns are less susceptible to defects. The method does not require that a copper layer is added to the, plastics, printing cylinder for subsequent engraving. Importantly, this means that galvanic deposition processes are not required in the manufacturing method of the first aspect of the invention.

The active pressure may mean that during the injection of the moulding material, an injection pressure of at least 150 mega-Pascals (MPa) is used. The injection pressure may be between 5 MPa and 15 MPa in the mould. The active pressure may mean that after the injection of moulding material, a holding pressure of at least 3 to 5 MPa is used. That is, the hardening of the moulding material within the vessel may take place under a holding pressure of 3-5 MPa. Preferably, the holding pressure is greater than the injection pressure. The holding pressure may be between 5 MPa and 10 MPa, and may be between 5 MPa and 8 MPa.

The overall process may be considered as, or be, different phases: injection in, which may be a pressure in a screw, barrel or nozzle, or any other mechanism outside the mould delivering the material in to the mould; then there is a pressure within the mould cavity until it fills completely; then there is a holding pressure, which is a phase where once the mould is completely full it then tries to 'fill again' or be 'filled again', in such a way that it applies a holding pressure to maintain. In the last phase, there is a squeezing of the full moulded material, by trying to push more material into the mould.

Alternatively, from another perspective, the active pressure may mean that during the injection of the moulding material, an injection pressure of at least 5 mega-Pascals (MPa) is used. The injection pressure may be between 5 MPa and 10 MPa. The injection pressure may be between 5 MPa and 8 MPa. The active pressure may mean that after the injection of moulding material, a holding pressure of at least 5 MPa is used. That is, the hardening of the moulding material within the vessel may take place under a holding pressure of more than 5 MPa. Preferably, the holding pressure is greater than the injection pressure. The holding pressure may be between 5 MPa and 10 MPa, and may be between 5 MPa and 8 MPa.

The active pressure may comprise an active clamping pressure, for instance applying a force inwardly toward the spine/cylinder (e.g. as opposed to simply resisting as material is injected into the cavity). The active clamping pressure may provide the holding pressure referred to above. The moulding apparatus may comprise a clamping unit. The method may comprise using the clamping unit to apply at least part of the active pressure to the moulding cavity. The clamping unit may be a bi-platen or toggle clamping unit. The clamping pressure may be determined by a clamping force applied by the clamping unit. The clamping force may depend on the size of the cylinder vessel, wall thickness sizes, and face length. The clamping force may be between 600-2000 tons. In one example implementation, the vessel of the moulding apparatus may comprise two or more mould blocks which are clamped together by a clamping unit of the moulding apparatus. The clamping unit clamps against the two or more mould blocks to keep them together while the polymer material is injected under a high pressure.

The active pressure may be applied, at least in part, through control of the injection of the moulding material through the at least one inlet. That is the injection of moulding material may provide the injection pressure referred to above. That is, the moulding material may be injected at a specific pressure or at a specific speed to achieve a desired active pressure within the moulding cavity. Example specific pressures are referred to above. This might be achieved by restricting or preventing the escape of material from the cavity. For example, the input flow, rate or pressure may be greater than any output (e.g. outlet or overspill or drain) flow, rate, or pressure, to achieve the active application of pressure.

During the injection moulding operation, the only route for the injection moulding material into or out of the cavity may be via the at least one inlet. That is, the moulding vessel may not comprise an outlet for the egress of moulding material. It may be possible to evacuate air or other gasses out of the moulding vessel through appropriate use of outlet valves (often called mould vents) etc., but the moulding vessel may prevent the outflow of moulding material. That is, the moulding vessel may provide provided a space that is sealed with respect to the egress of moulding material. In this way, by injecting sufficient moulding material into the moulding vessel, the desired active pressure may be generated within the moulding cavity.

The vessel may further comprise a removable centrally located spine within the vessel. The effecting of hardening of the moulding material within the vessel may be such that the moulding material hardens around the centrally located spine. The printing cylinder may comprise the hardened moulding material and spine. The spine may be hollow. The spine may be an existing printing cylinder. That is, an existing printing cylinder may be re-used and coated with material. The spine may be an existing plastics printing cylinder or may be an existing metal printing cylinder (e.g. a printing cylinder made using existing techniques). If the spine is a plastics printing cylinder, the plastics printing cylinder may be preheated before the moulding operation such as to from a plastic-to-plastic bond (e.g. meld, fuse or weld) between the spine and the moulding material during the injection moulding operation.

During at least part of the injection moulding operation, the temperature of the moulding vessel/cavity may be controlled. That is, the temperature of the moulding vessel/cavity may be heated or cooled as desired to control the temperature. The moulding vessel/cavity may be preheated before the injection moulding operation commences. The moulding cavity may be heated to a temperature of between 50-200 degrees Centigrade, between 50-180 degrees Centigrade, between 50-160 degrees Centigrade, between 50-140 degrees Centigrade, between 50-120 degrees Centigrade, or between 50-100 degrees Centigrade. The moulding cavity may be heated to a temperature of between 50 to 80 degrees Centigrade, between 60 to 90 degrees Centigrade, or between 80 to 100 degrees Centigrade. The moulding cavity may be heated to a temperature of between 70-200 degrees Centigrade, between 90-200 degrees Centigrade, between 110-200 degrees Centigrade, between 130-200 degrees Centigrade, between 150-200 degrees Centigrade, or between 170-200 degrees Centigrade. The method may thus comprise controlling the moulding cavity to be at a predetermined temperature or to be within a range of predetermined temperatures, and may comprise controlling the temperature within the moulding cavity to remain at a predetermined temperature or within a range of predetermined temperatures.

Significantly, heating the moulding vessel/moulding cavity during at least part of the injection moulding operation has been found to improve the quality of the finished printing cylinder by, for example, reducing shrinkage of the printing cylinder or at least reducing the effect of shrinkage on the printing cylinder. Heating the moulding vessel/cavity may thus help improve the finished quality of the printing cylinder by, for example, reducing the number of voids or other imperfections on the surface of the printing cylinder.

The vessel may comprise the removable centrally located spine, and heating the moulding vessel/cavity may comprise heating the spine. The spine may be hollow, and one or more heating or cooling channels may flow through the hollow core of the spine for the purpose of heating, cooling or otherwise controlling the temperature of the spine. The heating may be achieved from outside of the spine in another example, for example via a surrounding clamping unit.

The spine may be preheated externally from the mould vessel and injection moulding apparatus, i.e. before they are input into the mould vessel and injection moulding apparatus. The vessel/mould block itself, may have built in heating and cooling facilities controlled by the main injection moulding controller. The vessel/mould block may thus heat up before the moulding and then cool during the setting (hardening) cycle to help with the material cooling and also to lessen the thermal expansion which would otherwise trap the cylinder.

The at least one inlet may be arranged to introduce moulding material into the vessel from at least one of above and below the vessel. Preferably, the at least one inlet is arranged to introduce moulding material into the vessel from the side of the vessel. The at least one inlet being arranged to introduce moulding material into the vessel from the side of the vessel has been advantageously found to reduce shrinkage in the direction radial to the spine of the printing cylinder, which beneficially helps maintain the integrity and quality of the final moulded material. In more detail, injection moulding material from the side of the vessel means that the injection direction is perpendicular to the cylinder/spine. Thermal expansion in polymers can behave differently according to the direction of injected material, and perpendicular injection has been found to reduce the amount of shrinkage as compared to parallel injection. As the cylinder or spine is a fixed object the polymer cannot shrink effectively around the cylinder circumference but it can shrink more easily a long it's length. Therefore, it is advantageous to inject from the side of the cylinder so that the effect of the two potential directions of shrinkage is reduced around the circumference. The at least one inlet may be arranged to introduce moulding material from at least one of above and below the vessel and from the side of the vessel, but injected only from the side of the vessel is generally preferred. That is, in at least one example, injection does not take place from above or below the vessel/the resultant formation of the printing cylinder The at least one inlet may be arranged to introduce the moulding material from the side of the vessel at a position proximate to a top surface or bottom surface of the vessel, or at a position proximate to a central region of the vessel. A plurality of inlets may be provided, and the plurality of inlets may be spaced apart along all or part of the length or width of the vessel such that the moulding material is introduced into the vessel from a plurality of different locations.

Injecting moulding material through the at least one inlet may comprises controlling the injection of the moulding material such that the mould flow fronts of the injected moulding material collide in a way that generates a plurality of staggered weld lines on the printed article. The mould lines are thus generally non-linear along a length of the cylinder. In other words, the mould lines do not form a straight line.

In traditional injection moulding, the mould flow fronts meet at a common weld line, e.g. extending all the way along the finished moulded article. This common weld line may be an undesirable point of weakness in the printing cylinder. Significantly, by controlling the injection of the moulding material (e.g. from a plurality of inlets) such that the mould flow fronts of the injected moulding material collide to form staggered weld lines (that is, non-linear, or not in a straight line, or a deviating weld line or set of lines), this point of weakness is avoided/mitigated for.

The at least one inlet may comprise a plurality of inlets. Injecting the moulding material may comprise sequentially injecting moulding material through the different ones of the plurality of inlets according to a pre-set sequence. In other words, a sequential injection moulding procedure may be used. The method may comprise controlling valves for allowing/preventing flow through the plurality of inlets such that the moulding material is injected through only one or a sub-set of the inlets at a time. Sequential injection moulding material may beneficially help maintain the integrity and quality of the final moulded material.

The printing cylinder may have a length of between 400 mm and 2000 mm, and optionally between 800 mm and 1800 mm. The present invention is not limited to these examples. Printing cylinders may be less than 400 mm long, and may be more than 2000 mm long, for example the printing cylinders may be more than 4000 mm and more than 5000 mm.

The method may comprise covering at least part of the printing cylinder with a diamond-like carbon (DLC) layer, which may comprise DLC, or metal sputter and DLC.

Significantly, no further processing of the printing body is required after the DLC layer is coated on the printing cylinder (e.g. to form a useable, engravable, cylinder) apart from an optional step of engraving the DLC layer with the printing pattern. The hardness of the DLC is sufficient for the DLC to be used as an image carrier for printing Significantly, the method does not require the printing cylinder to be covered in copper and a subsequent layer of chromium. The use of metals such as chromium in the manufacture of cylinders is generally undesirable due both to the costs and complexity of the manufacturing process and increasing regulation against the use of such metals, e.g. due to health and safety concerns. Such metals and especially chromium have been identified as potentially carcinogenic.

As will be appreciated by the person skilled in the art, DLC is a class of amorphous carbon material that displays some of the typical properties of diamond. DLC exists in several different forms, each typically containing significant amounts of $sp^3$ hybridized carbon atoms. The term Diamond-Like Carbon (DLC) describes a whole family of DLCs which can be tailored to meet specific requirements. Pure DLC is a class of amorphous carbon that displays some of the typical properties of diamond. A deposition method called Plasma-Enhanced Chemical Vapor Deposition (PECVD) is advantageous in example embodiments. The term PACVD (Plasma Assisted Chemical Vapor Deposition) is sometimes used, and can mean the same thing. A type of DLC deposited or provided in this way is named a-C:H, amorphous carbon with hydrogen included. Hydrogen is introduced by the PECVD-process. Key points of PECVD are (i) highest surface quality of all DLC-deposition methods, (ii) by the PECVD-process, multiple layers (even nano-layers) can be precisely grown to form a stack, (iii) the PECVD process allows to include foreign atoms (i.e. doping) into the DLC-matrix to control the free surface energy and to modify e.g. the thin film properties at will. This holds for the stack surface, as well as for buried (doped) DLC in the whole stack. Doping could be undertaken using, for example, hydrogen, nitrogen, silicon, metals, and so on.

The method may comprise engraving a printing pattern into the printing cylinder prior to covering the at least part of the printing cylinder with the DLC layer.

The method may further comprise engraving a printing pattern into the DLC layer.

The engraving may be laser engraving. The depth of laser engraving may be finely controlled to vary ink release properties (see below), which may vary across the printing pattern.

In one example, the DLC layer has a thickness of more than 2 microns. In one example, the DLC layer has a thickness of more than 3 microns, or more than 5 microns. In one example, the DLC layer has a thickness of more than 8 microns. In one example, the DLC layer has a thickness of more than 15 microns. For DLC-films with a thickness of 15 microns or more, multilayer DLC stacks with alternating tribological properties may be useful. Here, a PECVD process is beneficial to control the overall properties, for example layer (e.g. film) compressive stress.

In one example, the DLC layer comprises a DLC outer layer and a DLC sub-layer beneath the DLC outer layer, the DLC of the DLC sub-layer having a lower intrinsic compressive stress than the DLC of the DLC outer layer. In principle it is possible to have also a multiple of DLC sub-layers having different material properties. Sometimes, intrinsic compressive stress might be described or defined as hardness, because in general the higher the intrinsic compressive stress the higher the hardness. The lower intrinsic compressive stress of the DLC sub-layer is less prone to fracture than the DLC outer layer, which reduces the chance of failure of the printing body. Additionally, the lower intrinsic compressive stress of the DLC sub-layer may be deposited more quickly. The DLC of the DLC sub-layer may be a doped DLC, having foreign atoms doped therein to lower the intrinsic compressive stress. Typically, the DLC of the DLC outer layer is harder with a lower coefficient of friction compared to chrome, which improves wear resistance of surface which are often in contact with a doctor blade during printing. While the DLC of the DLC sub-layer is typically less hard than that of the outer layer, it is still very hard (e.g. 2000 HV). In another example, the DLC outer layer might comprise a doped DLC. In another example, any DLC layer (e.g. a single, sole layer) might comprise a doped DLC. Generally, the DLC of any layer can be modified with processing parameter changes such as pressures, incoming ion energy during deposition, temperature and functional doping to control properties of the layer, and/or between the layers. In one example, there may not necessarily be distinct layers. Instead, the properties of the DLC layer might vary through the layer, for example in continuous or step-wise manner. Such variation might be achieved by variable doping of foreign atoms. The DLC sub-layer may not be a distinct layer, but may be at a different depth within the DLC layer.

In one example, the engraving comprises engraving the printing pattern into the DLC outer layer and the DLC sub-layer. Having the printing pattern in the DLC sub-layer provides better ink release during printing, which can reduce ink consumption. Varying the properties of the sub-layer is particularly advantageous when laser engraving is employed, as the laser engraving allows precise control of the depth of the engraving to correlate to the DLC in the sub-layer and the outer layer, thereby allowing properties within an engraved cell of an image carrier (i.e. the surface used for printing) to be varied. In some examples, the properties of the DLC in the DLC layer are varied across many sub-layers, and is tailored to the depth of laser engraving, allowing different printing results to be achieved in certain areas of the image carrier.

In one example, the properties of the DLC are controlled to vary across the DLC layer (for example by varying the doping across the DLC layer). This could be achieved by appropriately varying processing parameters controlling/within a vacuum chamber used in the formation of the layer. As such, the properties of the DLC in the DLC layer are predetermined and deliberately specified in combination with the printing pattern, and, where the properties also vary with depth, the depth to be engraved at each point on the printing pattern. This is in contrast to prior cylinders, in which the surface properties of the image carrier are completely uniform with zero control. This is particularly relevant to specialist printing such as in security printing. In one example, the method comprises coating DLC to form the DLC layer onto the substrate before engraving the printing pattern into the DLC layer. In one example, the coating DLC is by vapour deposition process.

In one example, the coating DLC is by a physical vapour deposition (PVD) process. In one example, the coating DLC is by a plasma-enhanced chemical vapour deposition (PECVD) process. These processes allow the deposition of DLC to be finely controlled, allowing foreign atoms to be doped in the DLC. This allows properties such as intrinsic compressive stress, hardness, coefficient of friction, conductivity and free surface energy control (i.e. the wettability of the surface, such as whether the surface is hydrophobic/hydrophilic and olephobic/oleophilic) to be varied throughout the DLC layer. The PECVD process occurs in a vacuum chamber, with the conditions in the chamber variable by computer to control the chamber's parameters and thereby vary the above-described properties. To form DLC from carbon, the carbon atoms have to impinge on the surface with a certain energy. That energy is typically above the thermal energy available by chemical vapor deposition. Therefore, DLC typically cannot be formed by pure thermal methods.

Having a more hydrophobic cell gives greater ink release properties in the engraved printing body. This is particularly useful in the lower tonal range (with a small engraved printing body), where it can reduce the need for extra solvents which are typically used in ink formulations to overcome loss of printing on the substrate in this (small cell) low range. Lower solvent usage/content can result in overall higher printing speeds, because there is less need for drying of the printed substrate in the printing machine drying units, which commonly restricts the maximum print speed. A-C:H (PECVD-process) is slightly hydrophobic. In terms of the so-called water-contact angle, a value of about 60 degrees can be achieved in example embodiments. Higher hydrophobicities can be achieved by adding foreign gaseous elements into the PECVD gas/plasma mixture.

PECVD is particularly advantageous when used in combination with laser engraving, as the precise control of depth of engraving which is possible during laser engraving allows the properties of the image carrier to be varied when the properties vary through the DLC layer. This means that the variation of properties with depth and depth of engraving can be easily varied to provide desired properties at the image carrier surface (e.g. to expose a hydrophilic surface, a hydrophobic surface or a conductive surface).

The method may comprise applying a metal carbide layer such as a nickel layer to the at least part of the printing cylinder prior to covering the at least part of the printing cylinder with the DLC layer. The metal carbide layer such as a nickel layer may be applied using a sputtering operation.

The printing cylinder may be adjusted in size by removing material from the printing cylinder, e.g. by using a lathe or other form of apparatus. The printing cylinder may be placed in another, e.g. larger, moulding apparatus and overmoulded with moulding material during an injection moulding operation to increase the size of the printing cylinder.

That is, the printing cylinder may be a size variable printing cylinder. That is, various different sizes of printing cylinder may be machined from the original moulded printing cylinder. The printing cylinder could then be re-used in varying sizes until there is no material left on the spine.

According to a second aspect of the invention, there is provided a method of manufacturing a printing cylinder. The method comprises providing a moulding apparatus comprising a cylindrical moulding vessel defining a moulding cavity. The vessel comprises at least one inlet for the ingress of moulding material. The method comprises performing an injection moulding operation comprising: injecting moulding material through the at least one inlet to substantially fill the moulding cavity with moulding material; and effecting hardening of the moulding material within the vessel. The method comprises removing the printing cylinder. During at least part of the injection moulding operation the temperature of the moulding vessel or moulding cavity is controlled.

That is the moulding cavity may be cooled, heated, or a combination of cooled and heated. In one example, the vessel may be preheated to 80 degrees Centigrade, and then may absorb the heat of the hot liquefied polymer (injected moulding material). A controller of the moulding apparatus may then activate a cooling mode to cool the moulding vessel and therefore the polymer so the polymer solidifies (no longer liquid) and is ready for the cylinder to be removed. The controller may then cool the mould back to 80 degree Centigrade, for instance, ready for the next cylinder. If there was no temperature control situation the mould would be at room temperature for first cylinder then it would rise and cool in an uncontrolled fashion according to the polymer injection cycle.

The second aspect of the invention thus does not require the active pressure to be applied, but does require the temperature of the moulding vessel/cavity to be controlled. Controlling the temperature of the moulding vessel/cavity during at least part of the injection moulding operation has been found to improve the quality of the finished printing cylinder by, for example, reducing shrinkage of the printing cylinder or at least reducing the effect of shrinkage on the printing cylinder. Controlling the temperature of the moulding vessel/cavity may thus help improve the finished quality of the printing cylinder by, for example, reducing the number of voids or other imperfections on the surface of the printing cylinder. That is, the temperature control of the mould achieves benefits in providing a printing cylinder with a high finish in addition to, or separately from the application of the active pressure. The temperature control within the mould allows for optimum polymer processing parameters. The high finish is achieved by keeping the polymer within a desired parameter range.

The moulding cavity may be heated to a temperature of between 50 and 120 degrees Centigrade. The moulding cavity may be heated to a temperature of between 80 and 100 degrees Centigrade. The method may thus comprise heating the moulding cavity to a predetermined temperature or to be within a range of predetermined temperatures, and may comprise controlling the temperature within the moulding cavity to remain at a predetermined temperature or within a range of predetermined temperatures.

The method of the second aspect of the invention may comprise some or all of the features described above in relation to the first aspect of the invention.

According to a third aspect of the invention, there is provided a printing cylinder comprising: a plastics cylinder, optionally made according to the first and/or second aspects. Optionally and advantageously, the printing cylinder might also comprise a diamond-like carbon, DLC, layer covering at least part of the plastics cylinder.

The plastics cylinder may comprise an engraved printing pattern. The DLC layer may cover the engraved printing pattern. The printing pattern may be engraved using electromechanical engraving or laser engraving into the polymer substrate, or typically laser engraving if engraved into the DLC substrate.

The DLC layer may comprise an engraved printing pattern. The printing pattern may be engraved using laser engraving.

Before coating the plastics cylinder with the DLC layer or engraving on the plastics cylinder, the plastics cylinder may be machined to a high finish on a turning centre such as a CFM or Duostar. This finish should ideally have a roughness average of Ra 0.02-0.05 micrometres ($\mu$m) Existing products are believes to be unable to achieve such a smooth finish of 0.02-0.05 Ra while also being sufficiently void/hole defect free.

The printing cylinder may further comprise a metal carbide layer (e.g. a nickel layer) disposed between the plastics cylinder and the DLC layer. The DLC layer may thus cover at least part of the metal carbide layer (e.g. a nickel layer) which may then cover at least part of the plastics cylinder. The metal carbide layer (e.g. a nickel layer) may be applied to the plastics cylinder using a sputtering operation.

The printing cylinder may comprise a spine. That is, the plastics cylinder may have a spine located therein. The plastics cylinder may be moulded over the spine.

The plastics cylinder may be manufactured using an injection moulding operation. The plastics cylinder may be manufactured using an injection moulding operation in which an active pressure is applied during at least part of the injection moulding operation.

The plastics cylinder may be manufactured using a method comprising providing a moulding apparatus comprising a cylindrical moulding vessel defining a moulding cavity. The vessel comprises at least one inlet for the ingress of moulding material. The method comprises performing an injection moulding operation comprising: injecting moulding material through the at least one inlet to substantially fill the moulding cavity with moulding material; and effecting hardening of the moulding material within the vessel. The method comprises removing the plastics cylinder. At least part of the injection moulding operation is performed in the presence of an active pressure being applied to the moulding cavity.

The printing cylinder may be manufactured using the method as described above in relation to the first or second aspect of the invention.

According to another aspect of the present invention, there is provided a moulding apparatus for implementing one or more method aspects of the present invention. The apparatus might comprise a cylindrical moulding vessel defining a moulding cavity. The vessel comprises at least one inlet for the ingress of moulding material.

A temperature control system may be provided, to ensure that during at least part of the injection moulding operation the moulding cavity is heated and/or cooled as desired. A controller or control system may be provided to control the flow of the moulding material.

Alternatively and/or additionally, the apparatus is controlled, or apparatus for providing active pressure is provided, to ensure that at least part of the injection moulding operation is performed in the presence of an active pressure being applied to the moulding cavity.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION OF AN EXAMPLE EMBODIMENT

Figure 2:
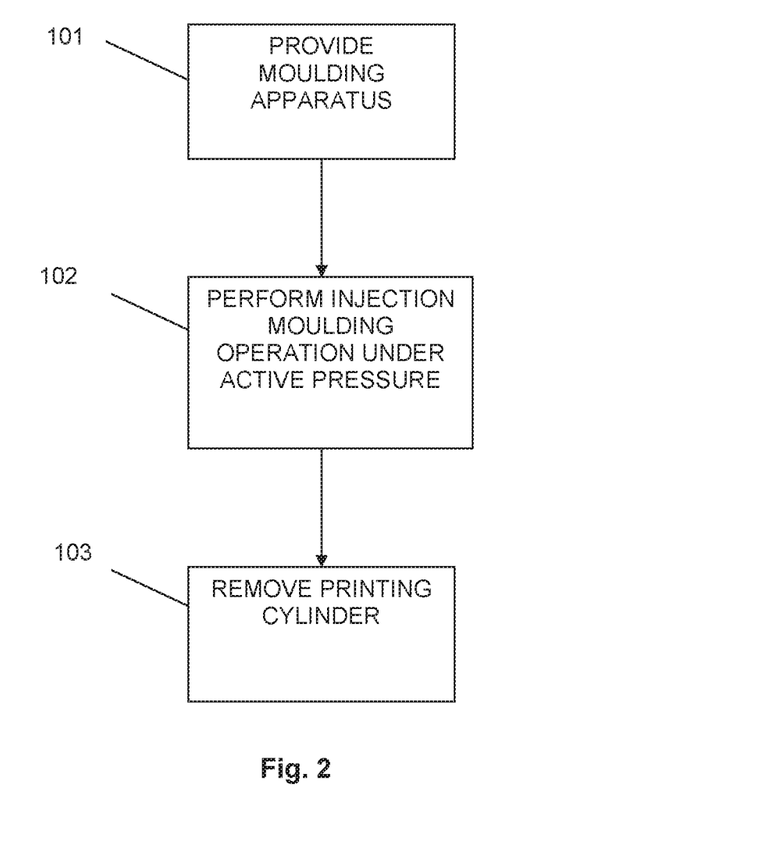
FIG. 2 shows a process diagram for manufacturing a printing cylinder according to the first aspect of the invention.
Figure 3:
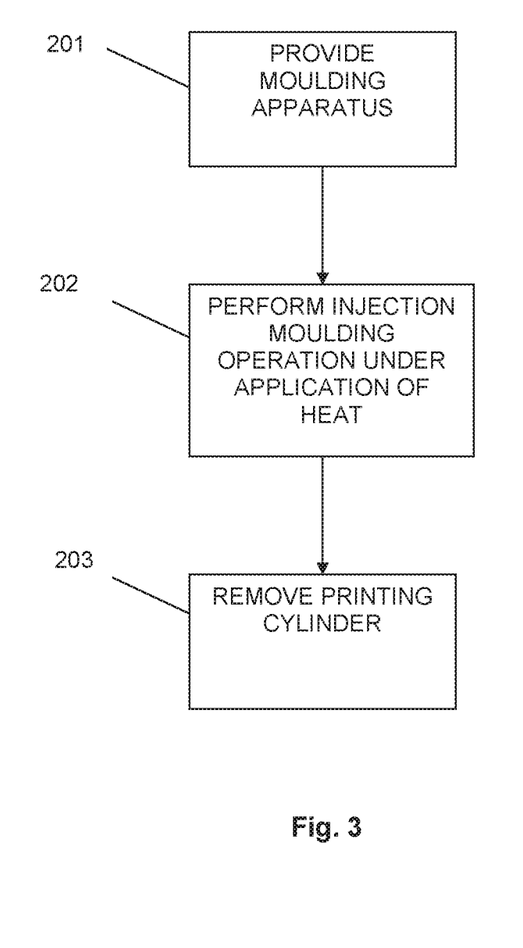
FIG. 3 shows a process diagram for manufacturing a printing cylinder according to the second aspect of the invention.

Referring to FIG. 2, there is shown a method of manufacturing a printing cylinder according to the first aspect of the invention.

Step 101 comprises providing a moulding apparatus comprising a cylindrical moulding vessel defining a moulding cavity. The vessel comprises at least one inlet for the ingress of moulding material.

In this example, the moulding apparatus comprises an injection unit and a clamping unit.

In this example, the at least one inlet is arranged to introduce moulding material into the vessel from the side of the vessel.

In this example, the at least one inlet comprises a plurality of inlets. The plurality of inlets are spaced apart along all or part of the length of the vessel such that moulding material may be introduced into the vessel for a plurality of different locations, e.g. spaced part along the length of the vessel.

In this example, the vessel further comprises a removable centrally located spine within the vessel. The effecting of setting/hardening of the moulding material within the vessel may be such that the moulding material hardens around the centrally located spine. The printing cylinder thus comprises the hardened moulding material and spine. The spine is hollow in this example.

Step 102 comprises performing an injection moulding operation comprising:

injecting moulding material through the at least one inlet to substantially fill the moulding cavity with moulding material; and effecting hardening of the moulding material within the vessel.

At least part of the injection moulding operation is performed in the presence of an active high pressure being applied to the moulding cavity.

In this example, the active pressure comprises an injection pressure during the injection stage and/or (preferably and) a holding pressure after the injection stage. The injection pressure is a clamping pressure, i.e. is provided at least in part by the clamping unit, and often in combination with pressurised injecting. In other words, the method comprises using the clamping unit to apply at least part of the active pressure to the moulding cavity. In particular, the clamping unit may act to keep two halves (or, generally, parts) of the moulding vessel together.

In this example, the clamping unit is a bi-platen or toggle clamping unit.

In this example, the moulding apparatus including the clamping unit and the moulding vessel are designed to withstand the high active pressure applied during the moulding operation.

Other ways of providing the active pressure are within the scope of the invention and may be used in addition to or separately to the application of clamping pressure as described above.

In this example, the moulding cavity is also heated during at least part of the moulding operation. The moulding cavity is heated to a temperature of between 80 and 100 degrees Centigrade in this example. The moulding apparatus comprises a control unit for controlling the heating of the moulding cavity such that the temperature within the moulding cavity remains at a predetermined temperature or within a predetermined temperature range.

In this example, heating the moulding cavity comprises heating the spine.

In this example, injecting moulding material through the at least one inlet comprises controlling the injection of the moulding material such that the mould flow fronts of the injected moulding material collide in a way that generates a plurality of staggered weld lines on the printed article. It will be appreciated that the weld lines are not visible under the naked eye. The material may be mixed sufficiently by this method so that the weld lines are not perceptible.

In more detail, a sequential injection moulding operation is performed such that moulding material is injected through the different ones of the plurality of inlets according to a pre-set or otherwise adaptable sequence. The controller of the moulding apparatus in this example thus acts to control the valves of the inlets so as to allow/prevent moulding material to be injected through the inlets according to the pre-set sequence or otherwise adaptable sequence.

Step 103 comprises removing the printing cylinder.

In this example, the cylinder has a length between 800 mm and 1800 mm.

The removed plastics printing cylinder is of high quality, and may be machined to provide a highly finished engraveable surface. The body of the printing cylinder can be machined at any one or many points within its diameter so that, significantly, the size of the printing cylinder is variable—i.e. the diameter can be varied. The high quality finish is such that the plastics printing cylinder may be engraved directly with the printing pattern. The printing cylinder may have less than 5% voids on the outer surface of the printing cylinder, less than 4% voids on the outer surface of the printing cylinder, less than 3% voids on the outer surface of the printing cylinder, less than 2% voids on the outer surface of the printing cylinder, or ideally less than 1% voids on the outer surface of the printing cylinder, and even less than or equal to 0.3% voids.

In this example, after the plastics printing cylinder has been removed, the method comprises engraving the printing pattern onto the outer surface of the plastics printing cylinder using a laser engraving process.

In this example, the outer surface of the plastics printing cylinder is then covered with a diamond-like carbon (DLC) layer.

In this example, a nickel layer is sputtered onto the outer surface of the plastics printing cylinder before the DLC layer is applied.

In another example, the outer surface of the plastics printing cylinder may be covered with the DLC and then the printing pattern may be engraved into the DLC layer using laser engraving.

The DLC layer provides a hard wearing outer surface for the printing cylinder. The finished printing cylinder may then be used in printing operations.

Referring to FIG. 2, there is shown another method of manufacturing a printing cylinder according to the second aspect of the invention. The example of FIG. 2 is similar to the example of FIG. 1 described above, but does not require the application of an active pressure during the moulding operation. Instead, the example of FIG. 2 achieves the advantageous high quality finish of the printing cylinder through use of the application of heat during the moulding operation.

Step 201 comprises providing a moulding apparatus comprising a cylindrical moulding vessel defining a moulding cavity. The vessel comprises at least one inlet for the ingress of moulding material.

Step 202 comprises performing an injection moulding operation comprising: injecting moulding material through the at least one inlet to substantially fill the moulding cavity with moulding material; and effecting hardening of the moulding material within the vessel.

During at least part of the injection moulding operation the moulding cavity is heated.

Step 203 comprises removing the printing cylinder.

Figure 4A:
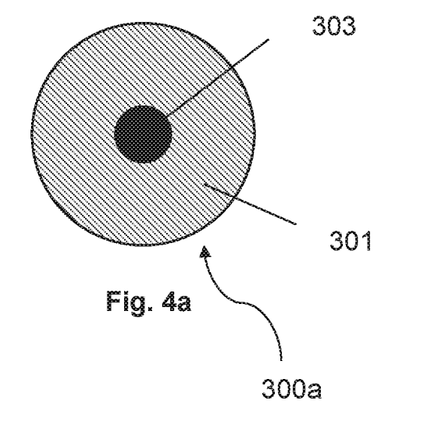
FIGS. 4a-4d show cross-sectional views through printing cylinders according to aspects of the present invention.

Referring to FIG. 4a, there is shown a printing cylinder 300a according to aspects of the present invention.

The printing cylinder 300a comprises a plastics cylinder 301 and a spine 303. The spin 303 may otherwise be known as an axle. In other examples, the spine 303 may be an external shaft of an internal bore or sleeve configuration. The plastics cylinder 301 may be manufactured using an injection moulding operation as described above in relation to the first or second aspect of the present invention.

Figure 4B:
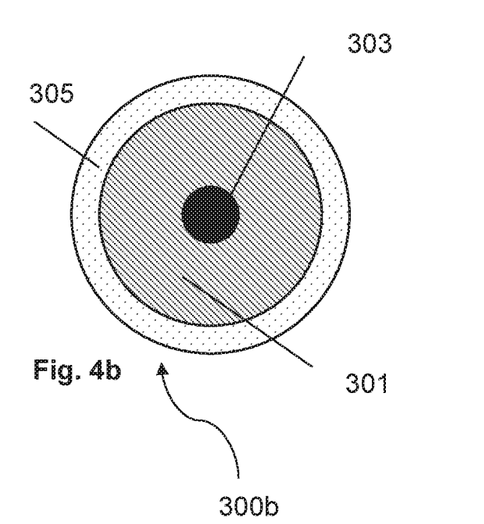

Referring to FIG. 4b, there is shown a printing cylinder 300b according to aspects of the present invention.

The printing cylinder 300b comprises a plastics cylinder 301, a spine 303, and a diamond-like carbon, DLC, layer 305 covering at least part of the plastics cylinder. The DLC layer 305 is a DLC sub-layer 305 is formed with a substantially cylindrical outer surface.

Figure 4C:
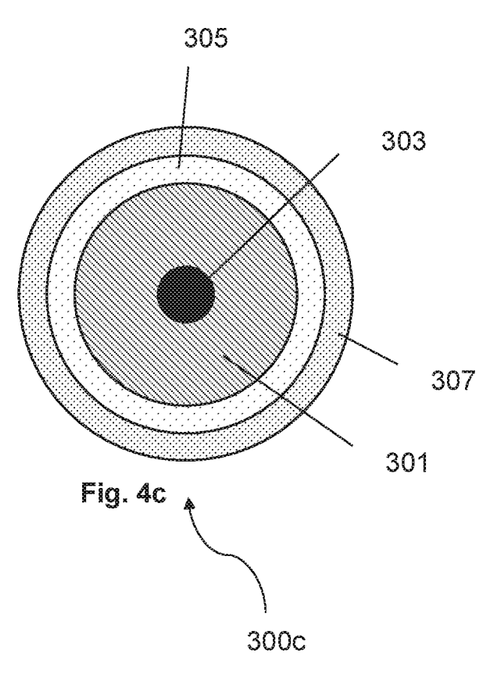

Referring to FIG. 4c, there is shown a printing cylinder 300c according to aspects of the present invention.

The printing cylinder 300c comprises a plastics cylinder 301, a spine 303, a DLC sub-layer 305 and a DLC outer-layer 307. Together, the DLC sub-layer 305 and the DLC outer layer 307 form a DLC layer. The DLC of the DLC sub-layer 305 has a lower intrinsic compressive stress than the DLC of the DLC outer layer 307.

The DLC layer has a thickness of more than 3 microns, or more than 5 microns. More specifically, the DLC layer has a thickness of more than 8 microns. More specifically, the DLC layer has a thickness of more than 15 microns. In the present example, the DLC outer layer has a thickness of between 2 and 3 microns and the DLC sub-layer has a thickness of between 12 and 13 microns. In other examples, the DLC sub-layer has a thickness of between 17 and 18 microns. In other example, an outer DLC layer thickness may be between 3 and 8 microns.

In other examples, the DLC layer comprises a single layer of DLC, for example, having the substantially the same intrinsic compressive stress throughout.

Figure 4D:
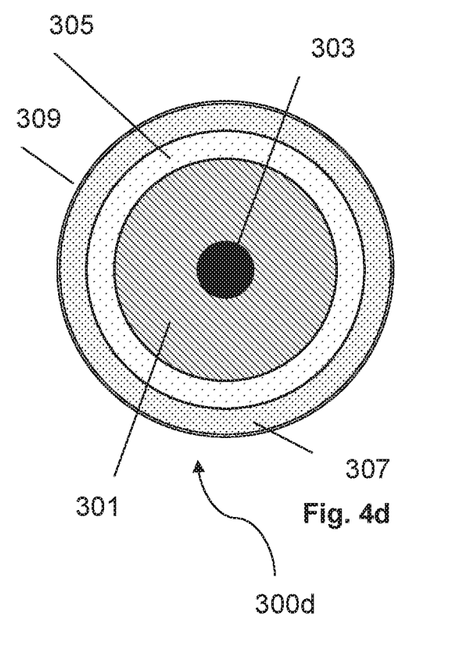

Referring to FIG. 4d, there is shown a printing cylinder 300d according to aspects of the present invention.

The printing cylinder 300d comprises a plastics cylinder 301, a spine 303, a DLC sub-layer 305 and a DLC outer-layer 307. Together, the DLC sub-layer 305 and the DLC outer layer 307 form a DLC layer. The DLC of the DLC sub-layer 305 has a lower intrinsic compressive stress than the DLC of the DLC outer layer 307.

Additionally, the DLC outer layer 307 has been engraved with a printing pattern 309. The printing pattern 309 is engraved directly in the DLC layer. In other examples, the printing pattern is engraved into the outer surface of the plastics cylinder 301 rather than the DLC layer.

Figure 5A:
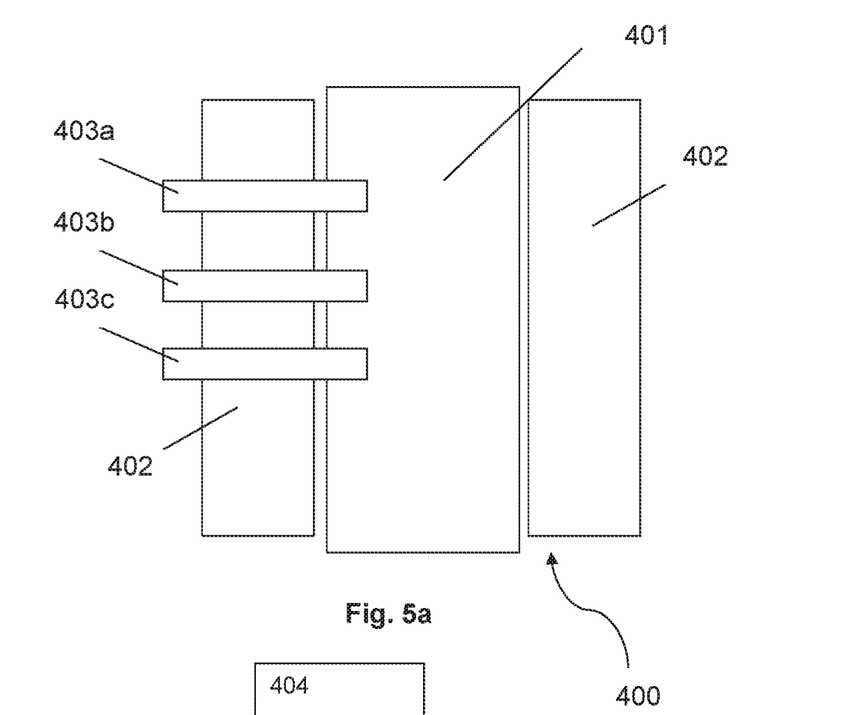
FIGS. 5a-5b show simplified schematic views of a moulding apparatus according to aspects of the present invention.

Referring to FIG. 5a, there is shown a moulding apparatus 400 for implementing one or more method aspects of the present invention. The apparatus 400 comprises a cylindrical moulding vessel 401 defining a moulding cavity. The vessel 401 comprises a plurality of inlets 403a-403c for the ingress of moulding material. The inlets 403a-403c are arranged to introduce moulding material into the vessel 401 from the side of the vessel 401. The inlets may, in some examples, be arranged on both sides of the vessel. The moulding apparatus 400 further comprises a means for applying the active pressure to the moulding cavity and thus the moulding material. In this example, the means is a clamping unit 402 for the application of a clamping pressure/clamping force to the cavity and thus the moulding material within the cavity. The clamping unit 402 may be controlled as discussed above to provide the active pressure.

Figure 5B:
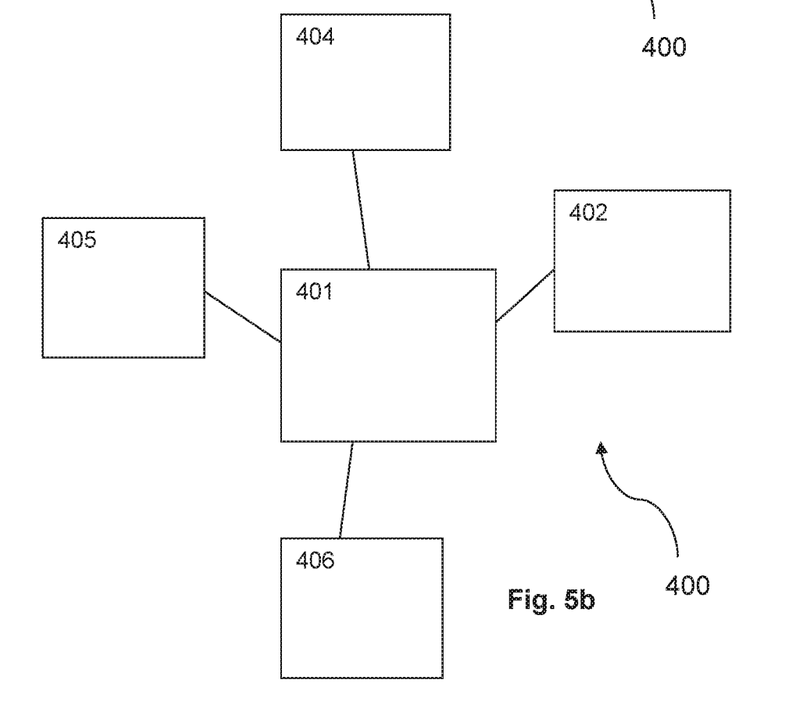

Referring to FIG. 5b there is shown additional components of the moulding apparatus 400 including: a temperature control system 404 to ensure that during at least part of the injection moulding operation the moulding cavity is heated and/or cooled; a controller or control system 405 to control the flow of the moulding material; and an injection unit 406 for injecting the moulding material.

Some example operating conditions for aspects of the present invention will now be described.

In some examples, during the moulding operation, the internal plastic pressures may be between 200-400 bar.

In some examples, during the moulding operation, the plastic temperature may be between 240-310 degrees Centigrade.

In some examples, the vessel may be heated to a temperature of between 80-200 degrees Centigrade.

In some examples, the plastic and cylinder annealing temperatures may be between 200 to 60 degrees Centigrade. That is, the temperature may start at 200 degrees and may be ramped down to 60 degrees.

In some examples, the finished cylinder has a percentage of voids of less than 1% and optionally less than 0.3%.

In some examples, the clamping force is between 600-2000 tons,

In some examples, the mould temperature is between 60-90 degrees Centigrade.

The method of manufacturing a printing cylinder described herein is especially appropriate to rotogravure and flexography printing forms/cylinders.

Although a few preferred embodiments of the present invention have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing a printing cylinder, the method comprising:
    providing a moulding apparatus comprising a cylindrical moulding vessel defining a moulding cavity, the vessel comprising at least one inlet for the ingress of moulding material;
    performing an injection moulding operation comprising: injecting moulding material through the at least one inlet to substantially fill the moulding cavity with moulding material; and effecting hardening of the moulding material within the vessel; and
    removing the printing cylinder, wherein at least part of the injection moulding operation is performed in the presence of an active pressure being applied to the moulding cavity;
    wherein the active pressure is applied, at least in part, through control of the injection of the moulding material through the at least one inlet,
    wherein injecting moulding material through the at least one inlet comprises controlling the injection of the moulding material such that mould flow fronts of the injected moulding material collide in a way that generates a plurality of staggered weld lines on the printing cylinder, and
    wherein the at least one inlet comprises a plurality of inlets, and wherein injecting the moulding material comprises sequentially injecting moulding material through the different ones of the plurality of inlets according to a pre-set sequence.

2. A method as claimed in claim 1, wherein the moulding material is injected under an active injection pressure of at least 150 mega-Pascal, MPa, and the hardening of the moulding material is performed under an active holding pressure of at least 3-5 MPa.

3. A method as claimed in claim 1, wherein
    the vessel further comprises a removable centrally located spine within the vessel for allowing the moulding material to harden around the centrally located spine;
    the effecting of hardening of the moulding material within the vessel is such that the moulding material hardens around the centrally located spine; and
    the printing cylinder comprises the hardened moulding material and spine.

4. A method as claimed in claim 1, wherein, during at least part of the injection moulding operation, the temperature of the moulding vessel or cavity is controlled by at least one of heating or cooling the moulding vessel or cavity.

5. A method as claimed in claim 4, wherein the moulding cavity is heated to a temperature of between 60 and 90 degrees Centigrade.

6. A method as claimed in claim 1, wherein the moulding apparatus comprises a clamping unit, and wherein the method comprises using the clamping unit to apply at least part of the active pressure to the moulding cavity.

7. A method as claimed in claim 6, wherein the clamping unit is a bi-platen or toggle clamping unit.

8. A method as claimed in claim 1, wherein during the injection moulding operation, the only route for the injection moulding material into or out of the cavity is via the at least one inlet.

9. A method as claimed in claim 1, further comprising covering at least part of the printing cylinder with a diamond-like carbon, DLC, layer.

10. A method as claimed in claim 9, further comprising:
    engraving a printing pattern into the printing cylinder prior to covering the at least part of the printing cylinder with the DLC layer; and/or
    engraving a printing pattern into the DLC layer.

* * * * *